Figure 1:
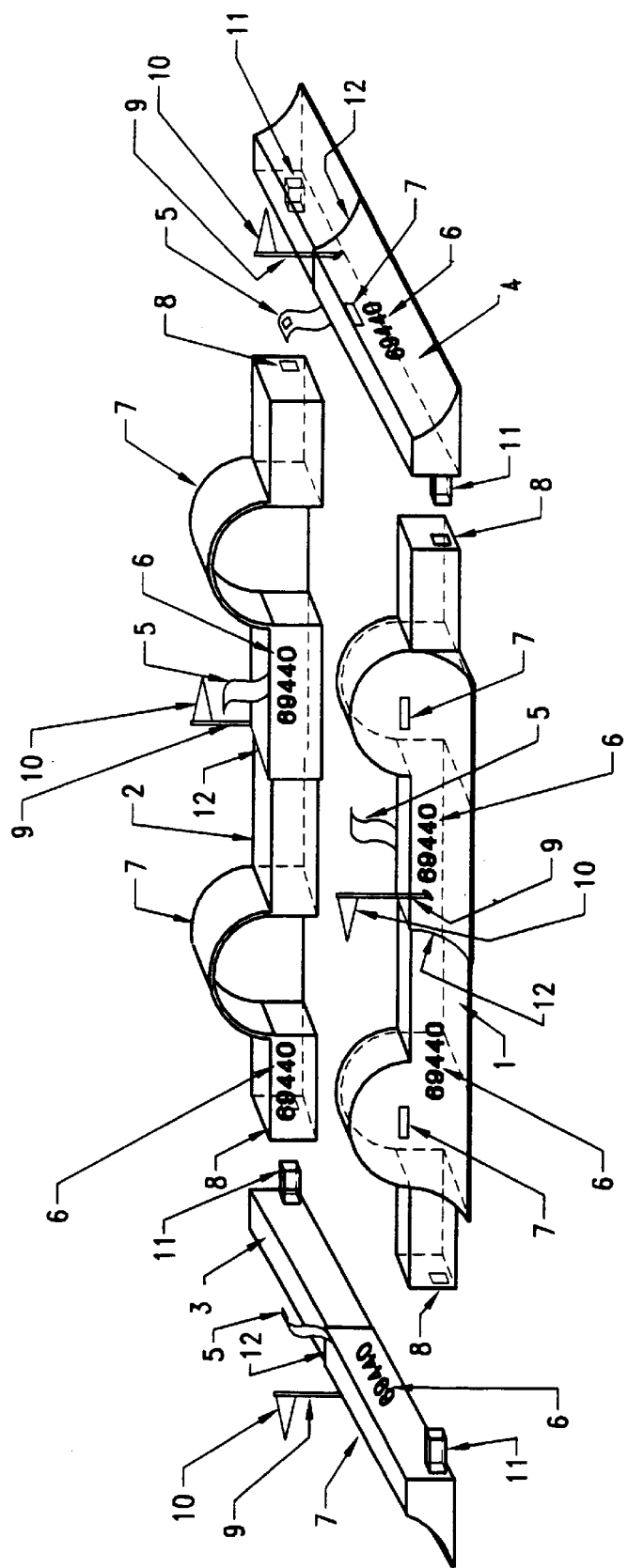

United States Patent [19]

Miller

[11] Patent Number: 5,842,733

[45] Date of Patent: Dec. 1, 1998

[54] AUTOMOBILE TIRE AND UNDERBODY PLURALITY SHIELDS

[76] Inventor: Marvin Leon Miller, 3000 North Ave., Richmond, Va. 23222

[21] Appl. No.: 624,664

[22] Filed: Apr. 3, 1996

[51] Int. Cl.$^6$ ....................................................... B60J 11/00
[52] U.S. Cl. ............................................ 296/136; 280/770
[58] Field of Search ............................. 296/136; 280/770

[56] References Cited

FOREIGN PATENT DOCUMENTS

| 101822 | 6/1983 | Japan | 296/136 |
|---|---|---|---|
| 405139163 A | 6/1993 | Japan | 296/136 |

*Primary Examiner*—Gary C. Hoge

[57] ABSTRACT

A outside winter unit that is the Automobile Tires and Underbody Plurality Snow Shields, That comes together as one complete shield that's designed to leave a dry space once they are removed, yet at the same time it prevents the snow from entering the underbody of your car, or around the tires at the same time it has it own securities about, which secures to the inside of the different parts of your car, also with the serial numbers displayed on the out side also with the owner having papers of ownership. The shields retract to reduce their size for storage. With the flag pole for safety.

5 Claims, 4 Drawing Sheets

AUTOMOBILE TIRE AND UNDERBODY PLURALITY SHIELDS

Plurality shields that comes together as one complete unit, that's designed to leave a dry space all around your car, for traction once they are removed from your automobile.

BACKGROUND OF THE INVENTION

The Automobile Tires and Underbody Plurality Snow Shields is designed to give your car traction after a snow storm, and once they are removed from your car, they will leave a dry space which enable you to drive from your parked place.

This invention comes together like joint into a socket, at each end, which seals the tires and underbody like a plug from the winter elements.

SUMMARY OF INVENTION

The Automobile Tires and Underbody Plurality Snow Shields reduce your shoveling, down to a sweep, The shields are plugs that prevent the snow from coming in , and leaves a dry space when they are taken off your car, for traction, where everyone else is shoveling out or getting stuck in their parking space.

The primary objective of this new invention is to leave a dry space all around your car for traction.

Another advantage that this invention has, is against thief, since this is and outside unit, it secures to all points of the car and with the serial numbers on it, retractable to fit the different types of cars, and flags for safety.

BRIEF DESCRIPTION OF THE DRAWING FIGURE'S

FIG. 1. Views the street and back side of this invention from it's overall view, FIG. 2. Views the curb side and front of this invention from it's overall view.

Figure 3:
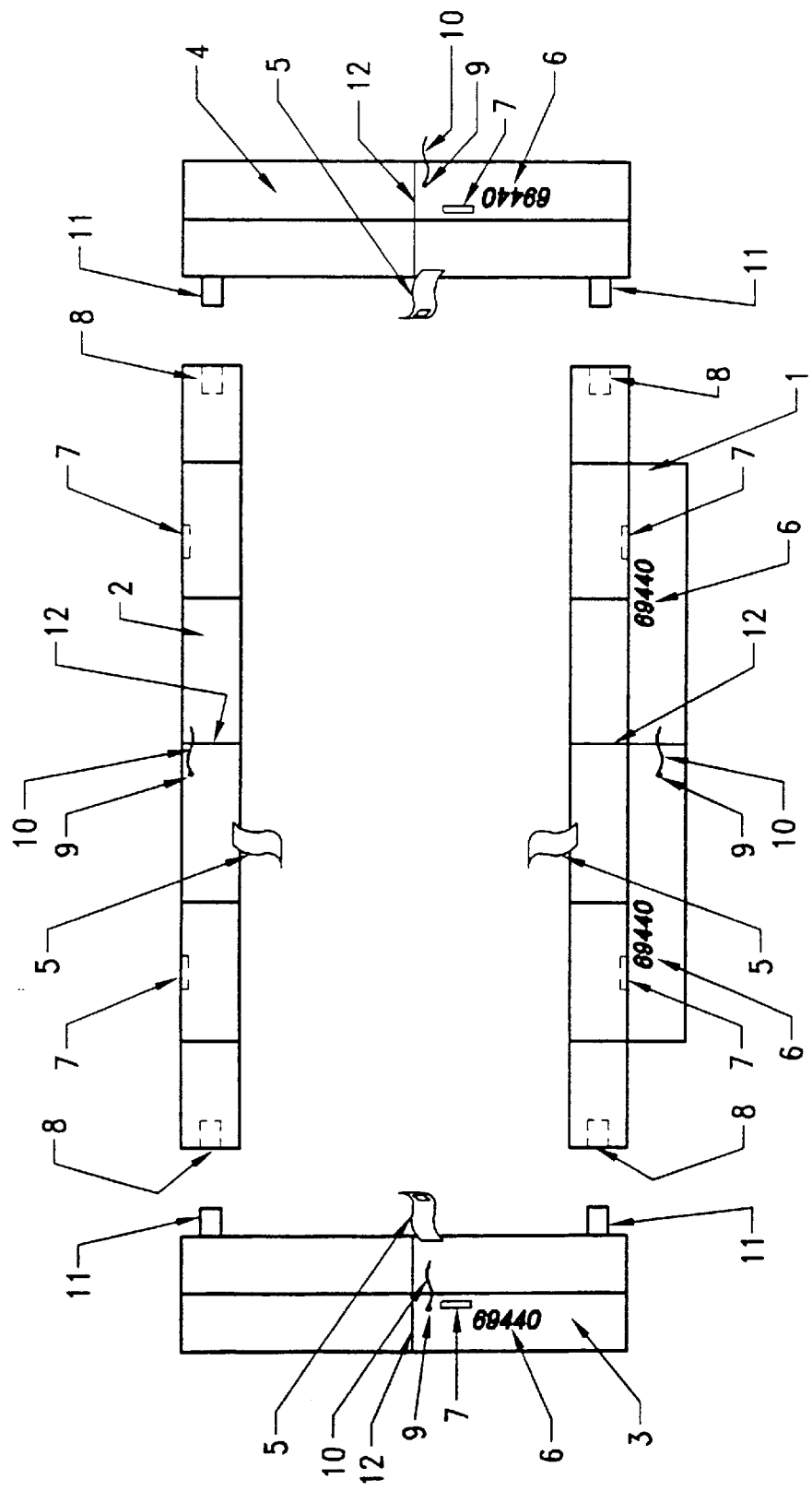

FIG. 3. Top view of invention as a whole.

Figure 4:
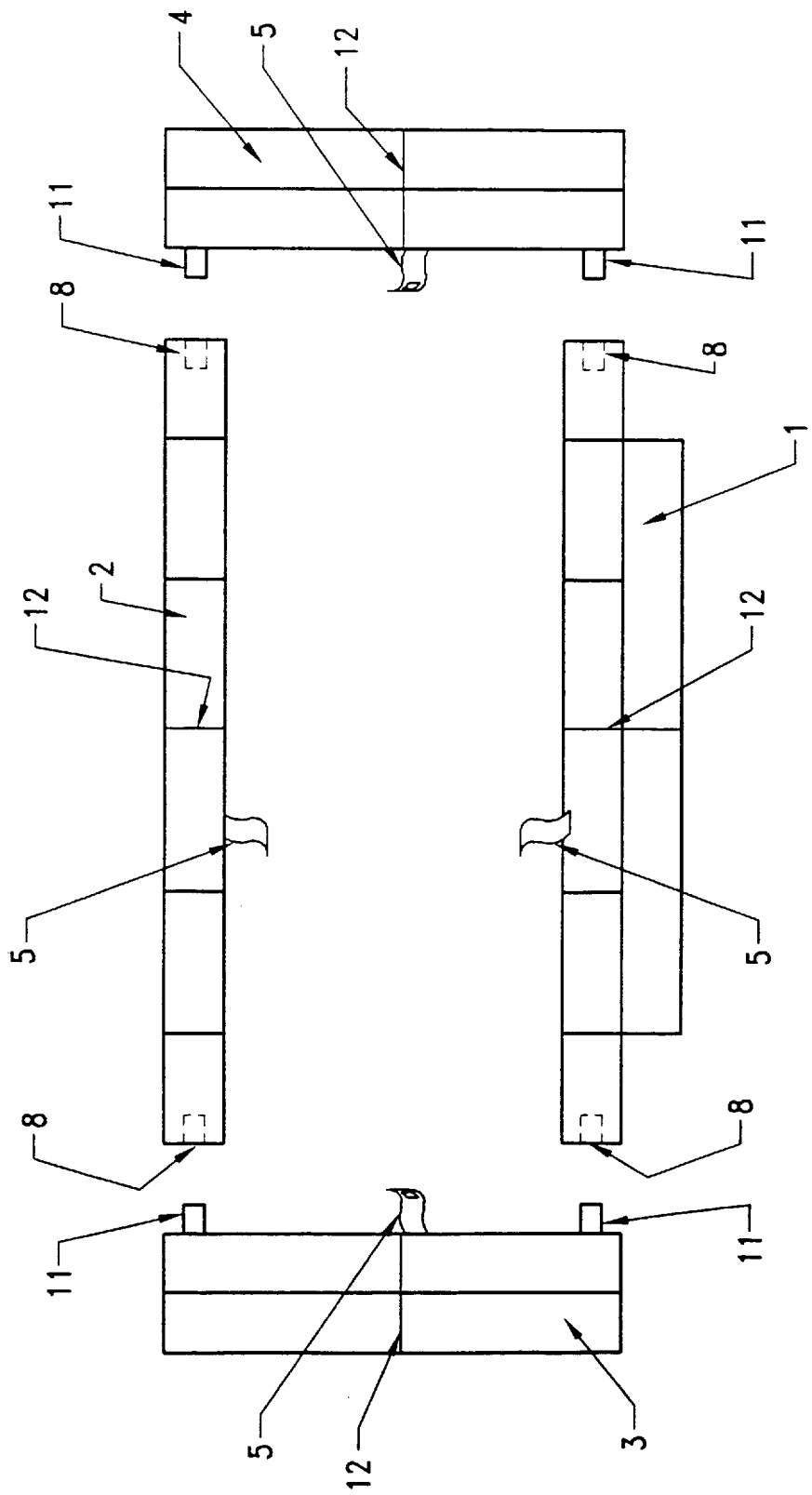

FIG. 4. Bottom view of invention as a whole.

DETAIL DESCRIPTION OF THE PREFERRED EMBODIMENT (S)

The Automobile Tires and Underbody Plurality Snow Shields which are placed all around your car before a winter snow, it's designed to prevent snow from building up around your tires and underbody, and to leave a dry space all around your car, once they are removed which will enable you to drive from your parking space without getting stuck, and since it's and outside unit it has it's own securities about it that will prevent thief.

Figure 2:
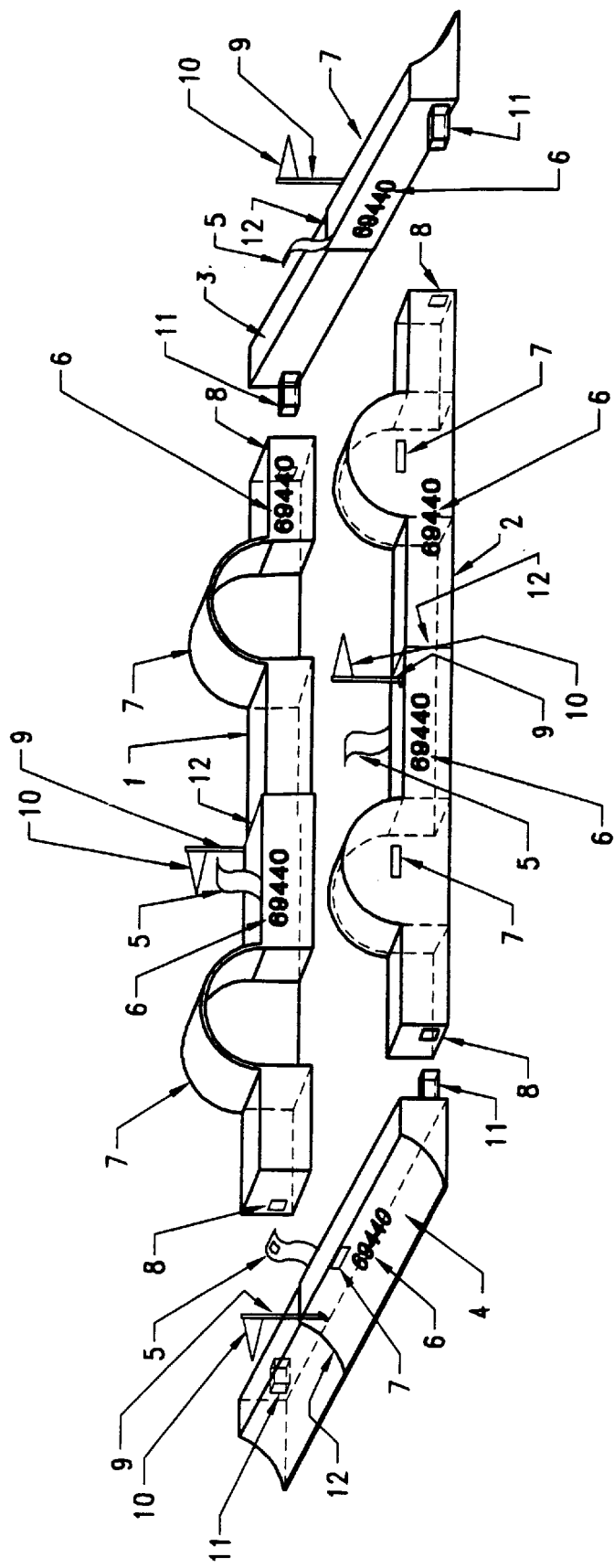

FIG. 3 Top view shows the placement of the plurality shields,

FIG. 1, street side 1, with FIG. 2. curb side 2, are placed first using handles 7, sliding them into the rim borders of both sides to shield the tires and underbody of your car, using to center retractable 12, to open or close to fit the length of your car, once in place FIG. 1. rear shield 4, it's slots 11 or each end slides into to end of each side of FIG. 1 street, side and FIG. 2 curb side, sockets 8, which seals it at that end, using handles 7, to slide it in place, than in FIG. 2 front shield 3, with it;s slots 11 on each end, using handles 7, to slide it into the front of FIG. 1, Street side 1, and FIG. 2, curb side 2, into it's sockets 8, on each ends that seals this invention as one complete unit, than to secure it to your car, open the doors, trunk and hood of your car and place straps 5, into them locking your doors and closing the trunk and hood of your car, yet with the serial numbers 6, on the plurality snow shields, that the owner will have papers of ownership , and for the safety of people walking by, the pole 9, with flag 10, screws into each of the plurality snow shields, this prevents people from tripping lover it. When removing your Automobile tires and underbody plurality snow shields, sweep the snow off around your car, remove the straps 5, from the doors and trunk and hood, than, remove the front shield 3, and rear shields 4, using handles 7, to remove them, than remove pole 9, with flag 10, unscrewing them, than remove FIG. 1, street side 1, using handles 7, to pull it from the underbody, same as for FIG. 2, curb side 2, than using the center retraction 12, to reduce it's size for easy storage.

Once the Automobile Tires and Underbody Plurality Snow Shields are removed and put away, you will be able to drive out of your parking space, because you will get that traction that your tires need to get your car out of it's parked place.

I claim:

1. A vehicle underbody perimeter snow shield, comprising:

two side shields, each adapted to be disposed along a respective lateral side of said vehicle between a bottom of said vehicle and the ground;

a front shield adapted to be disposed along a front end of said vehicle between said bottom of said vehicle and the ground;

a rear shield adapted to be disposed along a rear end of said vehicle between said bottom of said vehicle and the ground;

coupling means for attaching the side shields, the front shield, and the rear shield together to form a single shield unit; and means for varying the respective longitudinal lengths of said side shields, said front shield, and said rear shield, whereby said single shield unit can have variable dimensions to accommodate different vehicles.

2. The snow shield of claim 1, wherein each of said side shields, said front shield, and said rear shield comprise at least two shield elements, and wherein said means for varying comprises a telescopic nesting of said shield elements.

3. The snow shield of claim 1, wherein each of said side shields includes a vertically extending, semi-circular shield extension to cover tires of said vehicle.

4. The snow shield of claim 1, wherein each of said side shields includes handles for facilitating handling of said side shields.

5. The snow shield of claim 1, wherein each of said side shields, said front shield, and said rear shield include anti-theft straps adapted to be secured to a portion of said vehicle.

* * * * *

UNITED STATES PATENT AND TRADEMARK OFFICE
CERTIFICATE OF CORRECTION

PATENT NO. : 5,842,733
DATED : December 1, 1998
INVENTOR(S) : Marvin L. Miller

It is certified that error appears in the above-identified patent and that said Letters Patent is hereby corrected as shown below:

On the title page, Item [76] Inventor address should read as follows:

-- 3309 Barton Ave.,
Richmond Va. 23222. --.

Signed and Sealed this

Twenty-third Day of March, 1999

Attest:

Q. TODD DICKINSON

*Attesting Officer*   *Acting Commissioner of Patents and Trademarks*